United States Patent
Nguyen et al.

(10) Patent No.: US 11,795,365 B1
(45) Date of Patent: Oct. 24, 2023

(54) METHODS OF FORMING HYDROPHOBIC SURFACES FOR ENHANCING PERFORMANCE OF GEOTHERMAL OPERATIONS

(71) Applicant: Halliburton Energy Services, Inc., Houston, TX (US)

(72) Inventors: Philip D. Nguyen, Houston, TX (US); Brian Alan Evans, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/877,417

(22) Filed: Jul. 29, 2022

(51) Int. Cl.
| | |
|---|---|
| *F24T 10/20* | (2018.01) |
| *C09K 8/508* | (2006.01) |
| *C09K 8/035* | (2006.01) |
| *E21B 21/00* | (2006.01) |
| *C09K 8/588* | (2006.01) |
| *E21B 43/267* | (2006.01) |
| *C09K 8/68* | (2006.01) |

(52) U.S. Cl.
CPC ............ *C09K 8/5086* (2013.01); *C09K 8/035* (2013.01); *C09K 8/588* (2013.01); *C09K 8/68* (2013.01); *E21B 21/003* (2013.01); *E21B 43/267* (2013.01); *F24T 10/20* (2018.05)

(58) Field of Classification Search
None
See application file for complete search history.

(56) References Cited

U.S. PATENT DOCUMENTS

| | | |
|---|---|---|
| 6,206,956 B1 | 3/2001 | Muntz et al. |
| 8,216,321 B2 | 7/2012 | Deruelle et al. |
| 8,258,206 B2 | 9/2012 | Kanagasabapathy et al. |
| 8,362,295 B2 | 1/2013 | Tour et al. |
| 8,822,386 B2 | 9/2014 | Quintero et al. |
| 8,991,495 B2 | 3/2015 | Curtice |
| 9,683,160 B1 | 6/2017 | Sun et al. |
| 9,708,527 B2 | 7/2017 | Nguyen |
| 9,863,220 B2 | 1/2018 | Liang et al. |
| 9,879,515 B2 | 1/2018 | Green et al. |
| 10,072,198 B2 | 9/2018 | Ballard |
| 10,293,372 B2 | 5/2019 | Buvid et al. |
| 10,745,611 B2 | 9/2020 | Nguyen et al. |
| 11,208,591 B2 | 12/2021 | Monastiriotis et al. |

(Continued)

FOREIGN PATENT DOCUMENTS

WO 2019147515 A1 8/2019

OTHER PUBLICATIONS

Filing Receipt, Specification and Drawings for U.S. Appl. No. 17/584,615 entitled "Methods and Compositions for Enhancing Integrity and Thermal Conductivity of Wellbores in Geothermal Operations," filed Jan. 26, 2022, 19 pages.

(Continued)

*Primary Examiner* — Andrew Sue-Ako
(74) *Attorney, Agent, or Firm* — Conley Rose, P.C.; Rodney B. Carroll

(57) ABSTRACT

A method including forming a hydrophobic film on one or more surfaces as part of a geothermal operation in which a circulating fluid comprising water is injected into an injection well, absorbs heat, and is recovered from a production well prior to extraction of at least a portion of the heat therefrom and recycle of the circulating fluid back to the or another injection well.

18 Claims, 2 Drawing Sheets

(56) References Cited

U.S. PATENT DOCUMENTS

| | | | |
|---|---|---|---|
| 2002/0192385 A1 | 12/2002 | Jenkner et al. | |
| 2004/0226746 A1 | 11/2004 | Schmidt et al. | |
| 2008/0090088 A1 | 4/2008 | Deruelle et al. | |
| 2010/0025008 A1* | 2/2010 | Walford | F28F 17/005 165/45 |
| 2010/0167965 A1 | 7/2010 | Sebastian et al. | |
| 2010/0307756 A1* | 12/2010 | Jung | F24T 10/20 166/308.1 |
| 2011/0144386 A1 | 6/2011 | Tour et al. | |
| 2012/0181033 A1* | 7/2012 | Saini | C09K 8/265 166/308.1 |
| 2013/0025941 A1* | 1/2013 | Kumar | E21B 10/46 175/425 |
| 2013/0081812 A1 | 4/2013 | Green et al. | |
| 2013/0306314 A1 | 11/2013 | Curtice | |
| 2013/0341022 A1 | 12/2013 | Nguyen et al. | |
| 2015/0083397 A1* | 3/2015 | Monroe | E21B 41/02 166/244.1 |
| 2017/0335162 A1 | 11/2017 | Wang et al. | |
| 2019/0284463 A1 | 9/2019 | Mazard et al. | |
| 2020/0116397 A1* | 4/2020 | Yasumoto | F25B 30/06 |

OTHER PUBLICATIONS

Filing Receipt, Specification and Drawings for U.S. Appl. No. 17/716,571, entitled "Methods for Enhancing and Maintaining Heat Transfer Efficiency Between Geothermal Heat and Injection Fluid," filed Apr. 8, 2022, 25 pages.

* cited by examiner

10 ⟶

```
┌─────────────────────────────────────────────────────────────────┐
│ FORMING HYDROPHOBIC FILM ON ONE OR MORE SURFACES AS PART OF     │
│ GEOTHERMAL OPERATION IN WHICH CIRCULATING FLUID COMPRISING      │
│ WATER IS INJECTED INTO AN INJECTION WELL, ABSORBS HEAT, AND IS  │──11
│ RECOVERED FROM A PRODUCTION WELL PRIOR TO EXTRACTION OF AT      │
│ LEAST A PORTION OF THE HEAT THEREFROM AND RECYCLE OF THE        │
│ CIRCULATING FLUID BACK TO THE OR ANOTHER INJECTION WELL         │
└─────────────────────────────────────────────────────────────────┘
                                  ↓
┌─────────────────────────────────────────────────────────────────┐
│       INTRODUCING CIRCULATING FLUID INTO INJECTION WELL OF      │──12
│                        GEOTHERMAL SYSTEM                        │
└─────────────────────────────────────────────────────────────────┘
                                  ↓
┌─────────────────────────────────────────────────────────────────┐
│      ALLOWING CIRCULATING FLUID TO PASS THROUGH FRACTURES       │
│       IN FORMATION TO PRODUCING WELL, WHEREBY CIRCULATING       │──13
│                         FLUID IS HEATED                         │
└─────────────────────────────────────────────────────────────────┘
                                  ↓
┌─────────────────────────────────────────────────────────────────┐
│          PRODUCING CIRCULATING FLUID THAT IS HEATED FROM        │──14
│                         PRODUCING WELL                          │
└─────────────────────────────────────────────────────────────────┘
                                  ↓
┌─────────────────────────────────────────────────────────────────┐
│        EXTRACTING HEAT FROM CIRCULATING FLUID THAT IS HEATED    │──15
└─────────────────────────────────────────────────────────────────┘
                                  ↓
┌─────────────────────────────────────────────────────────────────┐
│       RECYCLING CIRCULATING FLUID FROM WHICH HEAT HAS BEEN      │──16
│              EXTRACTED TO THE OR ANOTHER INJECTION WELL         │
└─────────────────────────────────────────────────────────────────┘
```

*FIG. 1*

METHODS OF FORMING HYDROPHOBIC SURFACES FOR ENHANCING PERFORMANCE OF GEOTHERMAL OPERATIONS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to geothermal wells. More specifically, the present disclosure relates to minimizing fluid loss during operation of a geothermal well. Still more specifically, the present disclosure relates to creating hydrophobic surfaces for enhancing performance of geothermal wells.

BACKGROUND

Geothermal wells can be utilized to take advantage of the Earth's relatively constant subsurface temperature to extract heat from a downhole formation. The extracted heat can be utilized, for example, for the production of electricity. For example, a circulating fluid that has been heated downhole can be routed through one or more turbo-expanders, with effluent fluids from the one or more turbo-expanders passed through a heat exchanger and the cooled circulating fluid recycled back for reintroduction downhole for the extraction of additional heat. During such geothermal operations, it is desirable to minimize loss of the circulating fluid, thus reducing the need for replenishing the loss. Scale buildup and corrosion along the path of the circulating fluid are also undesirable.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a schematic flow diagram of a method, according to embodiments of this disclosure.

DETAILED DESCRIPTION

Figure 2:
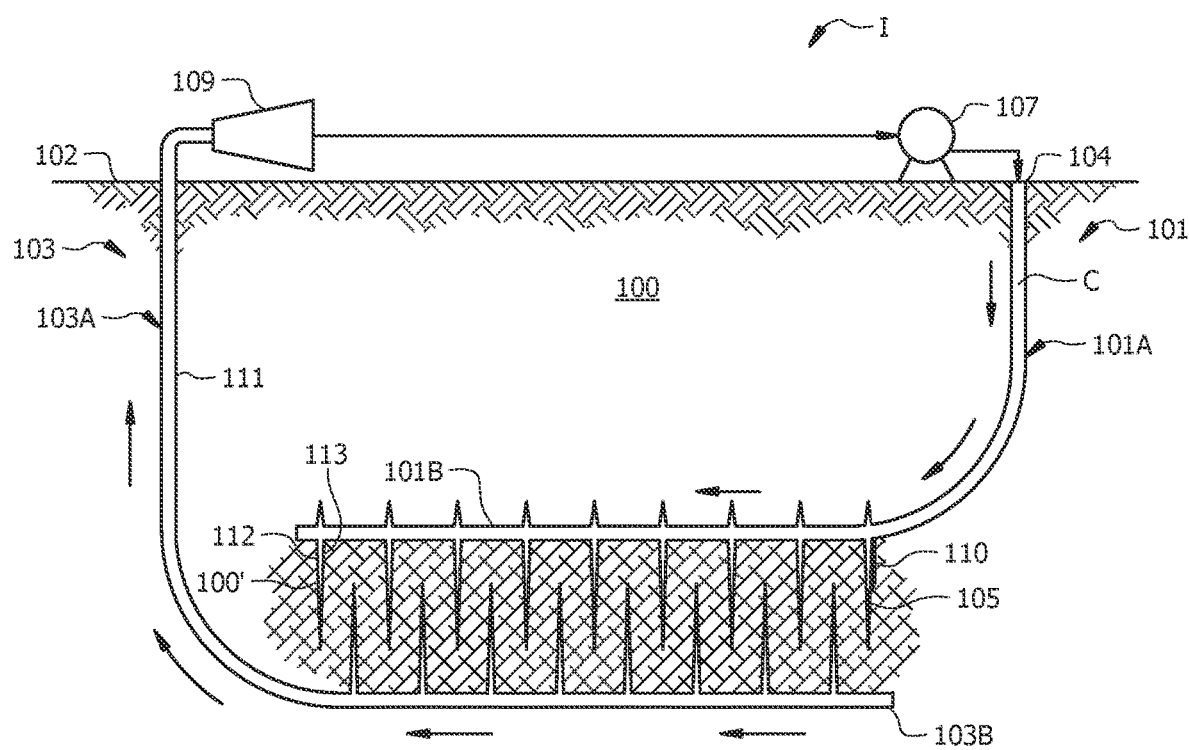
FIG. 2 is a schematic diagram illustrating an example of a closed loop wellbore system having surfaces that can be coated with a hydrophobic film, according to embodiments of this disclosure.

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

As utilized herein, the phrase "loss of circulating fluid" indicates loss of the circulation fluid from a circulation path of the circulating fluid, such as an open or closed circulation loop utilized during geothermal operations. The circulation loop can pass from an above ground injection pump at a surface into an injection well, and, via adjacent fractures formed from the injection well and a producing well, to a producing well, back to the surface, and via heat exchange apparatus (e.g., electricity generator, turboexpander, and/or heat exchanger) recycle back to the or another injection well. The loss of circulating fluid can include above ground and below ground (e.g., downhole) loss of circulating fluid, for example and without limitation, to the formation matrix, the wellbore wall, equipment leaks (e.g., leaks in tubulars in the well, surface piping, pump seals, heat exchangers, etc.), and the like.

Typically, not all circulating fluid (e.g., water) injected into geothermal wells that have been hydraulically fractured is fully recovered to be recycled. Some of the injected circulating fluid penetrates and imbibes into the formations surrounding the wellbore and/or created fractures, cracks, channels. Incomplete recovery of injection fluid, after absorption thereby of geothermal heat, that is required to provide the designed working fluid production rate for adequately operating a turbo-expander, or for other useful purposes, may necessitate the addition of additional circulating fluid (e.g., water) to replenish the water loss. Additionally, wetting of water on substrate surfaces, including pore spaces in the formation matrix, exposed surface of surface and/or downhole equipment, enhances scale formation on these surfaces, thus potentially resulting in detrimental effects on flow paths of water during its injection and production for heat recovery.

Disclosed herein are systems and methods for mitigating circulating fluid loss or imbibition into the rock formation during injection, production, and cycling back of the circulating fluid for reinjection as part of a geothermal well operation via which thermal energy is absorbed by the injected circulating fluid which can be produced back through a turbo-expander, for example, to generate electricity. The treatment of downhole surfaces, as described herein, creates a hydrophobic condition (e.g., on surfaces that contact the circulating fluid), thereby enhancing the recovery of the injected circulating fluid, without significant downhole circulating fluid loss, to maintain heated circulating fluid production rate for flowing, for example, through a turbo-expander. Corrosion and scale forming issues that often occur in the surface and downhole equipment can also be mitigated or prevented via the herein disclosed systems and methods.

The herein disclosed systems and methods enable more effective water usage. By providing for effective mitigation/prevention of circulating fluid (e.g., water) loss into the formation, circulating fluid recovery can be improved for power generation and circulating fluid recycle, thereby saving the cost of replenishing the circulating fluid (e.g., adding water). The system and method of this disclosure also provide for effective mitigation/prevention of corrosion and scale forming issues that can otherwise occur on downhole surfaces and surface and/or downhole equipment during geothermal operations.

A hydrophobic treatment fluid and a method of coating one or more surfaces of a geothermal wellbore system via the hydrophobic treatment fluid, according to embodiments of this disclosure will now be described with reference to FIG. 1, which is a schematic flow diagram of a method, according to embodiments of this disclosure, and FIG. 2, which is a schematic diagram illustrating an example of a closed loop wellbore system having surfaces that can be coated with the hydrophobic film, according to embodiments of this disclosure. Although described with reference to the closed loop wellbore system of FIG. 2, the herein disclosed hydrophobic film coating can be employed in a variety of geothermal systems, as will be apparent to those of skill in the art and with the help of this disclosure. Such geothermal systems are described, for example, in U.S. patent application Ser. No. 17/716,571 entitled, "Methods For Enhancing and Maintaining Heat Transfer Efficiency Between Geothermal Heat and Injection Fluid", filed Apr. 8, 2022, and U.S. patent application Ser. No. 17/584,615 entitled, "Methods and Compositions for Enhancing Integrity and Thermal Conductivity of Wellbores in Geothermal Operations", filed Jan. 26, 2022, the disclosure of each of which is hereby incorporated herein for purposes not contrary to this disclosure.

With reference to FIG. 1, a method 10 of this disclosure comprises: forming, at 11, a hydrophobic film (also referred to herein as a "hydrophobic layer", a "water barrier", or a "hydrophobic coating") on one or more surfaces as part of a geothermal operation. With reference to FIG. 2, during a geothermal operation, a circulating fluid C (flow of circulating fluid C indicated by arrows in FIG. 2) comprising water is injected into an injection well 101 (comprising substantially vertical portion 101a and substantially horizontal portion 101b in the embodiment of FIG. 2), absorbs heat, and is recovered from a production well 103 (comprising substantially vertical portion 103a and substantially horizontal portion 103b in the embodiment of FIG. 2), prior to extraction of at least a portion of the heat therefrom and recycle of the circulating fluid back to the or another injection well 101. As depicted in FIG. 2, the circulating fluid C can circulate from the injection well 101 and, via adjacent fractures 105 associated with injection well 101 and producing well 103, into producing well 103. After heating downhole in the subterranean formation 100, heated circulating fluid can exit producing well 103. Heat can be extracted from the heated circulating fluid C. For example, the heated circulating fluid can be passed through an electricity generator 109 (e.g., one or more turbine generators), wherein the heat can be utilized to produce electricity. The now relatively cool circulating fluid C can be pumped via an injection pump 107 back into the or another injection well 101. As noted above, a number of geothermal systems can be employed, and the closed loop exemplary geothermal wellbore system of FIG. 2 is not intended to be limiting, but is merely utilized herein to describe the hydrophobic film 110 of this disclosure and methods of making and using same, which hydrophobic film 110 of this disclosure is produced on surfaces of a geothermal system and serves to reduce loss of circulating fluid C, for example, to the formation 100.

Accordingly, with reference back to FIG. 1, in embodiments, method 10 can further comprise: introducing a circulating fluid C into an injection well 101 of a geothermal system I, as depicted at 12; allowing the circulating fluid C to pass through fractures 105 in a formation 100 to a producing well 103, whereby the circulating fluid C is heated, as depicted at 13; producing the circulating fluid C that is heated from the producing well 103, as depicted at 14; extracting heat from the circulating fluid C that is heated, as depicted at 15; and recycling the circulating fluid C from which the heat has been extracted to the or another injection well 101, as depicted at 16. Although depicted in a certain order in FIG. 1, it is to be understood that, in embodiments, one or more of steps 12-16 can be absent, and/or the steps 11-16 can be performed multiple times, or can be performed in another order. By way of example, forming the hydrophobic film 110 on one or more surfaces at 11 can be effected before, during, and/or after one or more of the steps 12-16, such as during the introducing of the circulating fluid C into the injection well 101 at 12.

Certain embodiments of the methods and compositions disclosed herein may directly or indirectly affect one or more components or pieces of equipment associated with the disclosed compositions. For example. FIG. 2 illustrates a system of wellbores and propped fractures in a subterranean formation, in accordance with certain embodiments of the present disclosure. The subterranean formation 100 includes a production wellbore 101 that has been drilled from the surface 102 to penetrate at least a portion of the formation 100. As shown, production wellbore 101 includes at least one substantially vertical portion 101A extending from location 102 at the surface and at least one substantially horizontal portion 101B that extends from the bottom of the vertical portion 101A. The production wellbore 103 may be coupled to an electricity generator 109, for example and without limitation, a turbine. The subterranean formation 100 also includes injection wellbore 101 that has been drilled from a location 104 at the surface 102 to penetrate at least a portion of the formation 100. As shown in FIG. 2, injection wellbore 101 includes at least one substantially vertical portion 101A extending from the surface at location 104 and at least one substantially horizontal portion 101B that extends from the bottom of the vertical portion 101A. Further, the injection wellbore 101 may be coupled to an injection pump 107. In some embodiments, the horizontal portion 103B of the production wellbore 103 may be parallel to the horizontal portion 101B of the injection wellbore 101. In some embodiments, the horizontal portions 101B and 103B of the injection wellbore 101 and the production wellbore 103, respectively, may be within a range of 50 to 1000 feet of one another.

In certain embodiments, the fractures 105 may be created and/or propped via both the injection wellbore 101 and the production wellbore 103. In certain embodiments, the fractures 105 may be created in parallel to one another. In certain embodiments, the fractures 105 may be created such that each primary fracture generated by one wellbore is located between, or in close proximity to, two primary fractures generated by the other wellbore.

In embodiments, a proppant slurry may be used to create and/or prop one or more fractures 105. As described hereinbelow, one or more surfaces of a geothermal system, such as geothermal system I of FIG. 2, can be coated with a hydrophobic film according to this disclosure by incorporating one or more hydrophobic film-forming agents into a fracturing fluid utilized during hydraulic fracturing of the wellbore to produce fractures 105.

In embodiments, circulating fluid C can be injected into injection wellbore 101 and may travel to one or more propped fractures 105 to absorb heat in the rock formation 100. Subsequently, a high-temperature circulating fluid C can travel from the propped fractures 105 to a production wellbore 103 for production. In embodiments, the high-temperature circulating fluid C can then be used to generate electricity. For example and without limitation, the high-temperature circulating fluid C may be routed through one or more turbo-expanders 109. Effluent fluids discharged from the turbo-expanders 109 can pass through a heat exchanger and be recycled to the injection wellbore 101.

In embodiments, two wellbores may be drilled via a drilling composition comprising a drilling fluid and a hydrophobic treatment fluid of this disclosure, whereby the hydrophobic film 110 can be deposited on the one or more surfaces of the geothermal system I. One wellbore may be used for injection, and the other wellbore may be used for production, as described above. The hydrophobic treatment fluid may penetrate into the walls of the wellbores and seal off the formation 100 from circulating fluid C loss.

In embodiments, the hydrophobic film 110 is formed on the one or more surfaces of the geothermal system I by injecting one or more hydrophobic film-forming agents directly into the circulating fluid at any convenient location (e.g., just prior to injection at location 104, upstream from injection pump 107, downstream of electricity generator 109, etc.)

The one or more surfaces coated by the hydrophobic film 110 according to this disclosure can include, without limitation, downhole surfaces, such as, without limitation, surfaces of formation particulates located in a wellbore wall 111 or in a formation matrix 100 adjacent the wellbore wall 111, a surface of the proppant particles 112 used to prop fractures 105, surfaces of the created fracture 105 faces 113, and/or surfaces of the formation 100 particulates in a formation 100 matrix 100' adjacent the fracture 105 faces, and/or surfaces of downhole and/or surface equipment (e.g., circulating fluid C contact surfaces interior to electricity generator 109 and/or injection pump 107).

As noted above, in embodiments, the hydrophobic film 110 can be created during drilling of the injection well 101, the production wellbore 103, or both. In such embodiments, forming the hydrophobic film 110 can further comprise forming a drilling fluid comprising one or more hydrophobic film-forming agents (also referred to herein simply as "hydrophobic agents"), and utilizing the drilling fluid during the drilling of the injection well 101, the production well 103, or both, whereby the one or more hydrophobic film-forming agents coat the one or more surfaces thereby forming the hydrophobic film 110. The one or more surfaces can comprise surfaces of formation particulates located in a wellbore wall 111 or in a formation matrix 100' adjacent the wellbore wall 111. The hydrophobic film 110 reduces circulating fluid loss (e.g., penetration and/or imbibition of water into the formation 100 surrounding the wellbore (e.g., injection wellbore 101, production wellbore 103)) during the circulation of the circulating fluid C relative to circulation of the circulating fluid C in the absence of the hydrophobic film 110.

Alternatively or additionally, as noted hereinabove, in embodiments, the hydrophobic film 110 can be deposited on the one or more surfaces during hydraulic fracturing of the injection well 101, the production well 103, or both. In such embodiments, forming the hydrophobic film 110 can further comprise forming a fracturing fluid comprising one or more hydrophobic film-forming agents, and utilizing the fracturing fluid during hydraulic fracturing treatments to generate propped fractures 105 in the injection well 101, the production well 103, or both, whereby the one or more hydrophobic film-forming agents are allowed to coat the one or more surfaces thereby forming the hydrophobic film 110. In such embodiments, the one or more surfaces can comprise a surface of the proppant particles 112, the created fracture 105 faces 113, and/or the formation 100 particulates in a formation 100 matrix 100' adjacent the fracture 105 faces. The hydrophobic film 110 reduces loss of circulating fluid (e.g., penetration and/or imbibition of water into the formation 100 matrixes surrounding the fracture 105 faces) during subsequent circulation of the circulating fluid C relative to circulation of the circulating fluid C in the absence of the hydrophobic film 110.

Alternatively or additionally, as noted above, in embodiments, forming the hydrophobic film 110 further comprises continuously or intermittently adding (e.g., metering) one or more hydrophobic film-forming agents at a known concentration into a flow stream of the circulating fluid C, thereby allowing the one or more surfaces to be coated with the hydrophobic film 110. Again, the one or more surfaces can comprise a surface of a wellbore wall 111, a formation matrix 100 adjacent the wellbore wall 111, fracture 105 faces, a formation matrix 100 adjacent the fracture faces, and/or surfaces of downhole and/or surface equipment (e.g., circulating fluid C contact surfaces interior to electricity generator 109 and/or injection pump 107).

The surface equipment can comprise, without limitation, pumps, compressors, turbo-expanders, heat exchangers, condensers, tubing, pipes, or a combination thereof. The hydrophobic film 110 can coat a contact surface of surface equipment that contacts the circulating fluid C during circulation thereof in geothermal operations.

In embodiments, the one or more surfaces comprises a downhole surface, such as, for example, a surface selected from a wellbore surface (e.g., wellbore wall 111), a wellbore equipment surface, a near-wellbore region surface, a subterranean formation 100 surface, a subterranean formation 100 pore surface, a fracture 105 surface, a natural fracture 105 surface, an induced fracture 105 face 113 surface, a proppant 112 surface, or a combination thereof.

Forming the hydrophobic film, at 11, can further comprise contacting the one or more surfaces with a hydrophobic treatment fluid comprising one or more hydrophobic film-forming agents and a base fluid. The hydrophobic treatment fluid can comprise an aqueous-based fluid, a non-aqueous-based fluid, a gas, a foam, an emulsion, or a combination thereof. The one or more hydrophobic film-forming agents can be dispersed in the base fluid in an amount ranging from about 0.01% to about 15%, from about 0.01% to about 10%, or from about 0.01% to about 5% by weight of the base fluid.

In embodiments, the hydrophobic treatment fluid comprises an oil-based fluid, an aqueous-based fluid, an aqueous-miscible fluid, a water-in-oil emulsion, or an oil-in-water emulsion. By way of non-limiting examples, the oil-based fluid can be selected from alkanes, olefins, aromatic organic compounds, cyclic alkanes, paraffins, diesel fluids, mineral oils, desulfurized hydrogenated kerosenes, or a combination thereof. By way of non-limiting examples, the aqueous-based fluid can be selected from fresh water, saltwater (e.g., water containing one or more salts dissolved therein), brine (e.g., saturated salt water), seawater, and a combination thereof. By way of non-limiting examples, the aqueous-miscible fluid can be selected from alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; derivatives thereof; or a combination thereof.

In embodiments, the one or more hydrophobic, film-forming agents can be selected from solvated silicon dioxide, an organo-siloxane, a fluoropolymer, a fluorinated compound, a tetrafluoroethylene/(perfluoroalkyl) vinyl ether copolymer, a perfluoroalkyl phosphate, a perfluoroalkyl ethyl methacrylate, a fluorinated hydrocarbon, a polyfluoroalkyl ethyl methacrylate/alkyl methacrylate copolymer, per fluoroalcohol phosphate, a per fluoroalcohol phosphate/polysiloxane mixture, a per fluoroalcohol phosphate/acrylate silicone copolymer mixture, a tetrafluoroethylene/hexafluoropropylene copolymer, polytetrafluoroethylene, poly xylylene, a fluorinated polyhedral oligomeric silsesquioxane, an alkoxysilane, a chlorosilane, a fluorosilane, a perfluoroalkyl silane, a fluorosilane having an urethane linkage, a fluorosilane having its silicone part partially modified with fluorine or fluoride, a fluorosiloxane, a fluoroalkylsilane, a fluorosilazane, or a combination thereof.

In embodiments, the hydrophobic, film-forming agents can be selected from hydrophobically modified amine-containing polymers, wherein the amine-containing polymers comprise at least one selected from the group consisting of: a polyamine, a polyimine, a polyamide, poly(2-(N,N-dimethylamino)ethyl methacrylate), poly(2-(N,N-diethylamino)ethyl methacrylate), poly(vinyl imidazole), a copolymer thereof, and a combination thereof, and wherein the hydrophobic modification comprises a C4-C30 characterized by at least one selected from a straight chain, a branched chain, an unsaturated C—C bond, an aryl group, and a combination thereof. The hydrophobic film-forming agents and resulting hydrophobic films 110 of this disclosure can be high temperature tolerant, meaning they are operable for mitigating water imbibition and loss to the formation 100 at temperatures experienced downhole. For example, in embodiments, the hydrophobic film-forming agents and resulting hydrophobic films 110 of this disclosure can be operable at temperatures of at least about 150° C., 250° C., or 350° C., for example, from about 150° C. to about 250° C., from about 200° C. to about 300° C. or from about 150° C. to about 350° C., or more.

In embodiments, the hydrophobic treatment fluid comprises a hydrophobic emulsion comprising: an aqueous continuous phase having dispersed therein a plurality of non-aqueous discontinuous phase droplets, wherein each of the non-aqueous discontinuous phase droplets comprises a plurality of surfactant molecules and a hydrophobic film-forming agent, wherein each surfactant molecule comprises a hydrophilic head portion and a hydrophobic tail portion, wherein each of the plurality of non-aqueous discontinuous phase droplets comprises the plurality surfactant molecules having the hydrophilic head portions disposed into a droplet outer layer with the hydrophobic tail portions extending inward from the droplet outer layer toward the hydrophobic film-forming agent, wherein the droplet outer layer encloses the hydrophobic film-forming agent.

As described hereinabove, in embodiments, the hydrophobic treatment fluid comprises a drilling fluid, a fracturing fluid, or the circulating fluid C.

In embodiments, the hydrophobic treatment fluid comprises (e.g., the hydrophobic film-forming agent can comprise) hydrophobic nanoparticles (e.g., nanoparticles that are repellent to water) to facilitate recovery of circulating fluid C and mitigate/prevent imbibition thereof into the subterranean formation 100 during geothermal operations (e.g., during circulating of the circulating fluid C). In such embodiments, method 10 can further include forming the hydrophobic nanoparticles. In embodiments, the hydrophobic nanoparticles are formed of a material that is naturally hydrophobic. In alternative embodiments, hydrophobic nanoparticles are formed from non-hydrophobic nanoparticles by rendering non-hydrophobic nanoparticles (e.g., nanoparticles having a surface that is not hydrophobic, such as nanoparticles having a neutral or hydrophilic surface) hydrophobic by modifying a surface of the non-hydrophobic nanoparticles with a hydrophobic surface treatment. The hydrophobic surface treatment can comprise attaching a surface modification agent to the (e.g., inorganic oxide) nanoparticles to modify the surface of the (e.g., inorganic oxide) nanoparticles, and make the surfaces hydrophobic. The surface modification agent can comprise a first end configured for attaching (e.g., covalently, ionically or through strong physisorption) to the surface of the nanoparticles, and a second end that imparts steric stabilization for preventing the nanoparticles from agglomerating (e.g., permanently fusing) together. The nanoparticles subjected to this surface modification can comprise, for example, a material selected from silica, silicon oxide, aluminum, iron, titanium, metal oxides, metal hydroxides, graphene, or a combination thereof. The hydrophobic nanoparticles can thus be formed by at least partially coating (e.g., partially or completely coating) nanoparticles that are not hydrophobic, with a hydrophobic coating.

In embodiments, nanoparticles that are not hydrophobic are rendered hydrophobic via a surface treatment with an organosilane, wherein the organosilane comprises an alkyl group. The alkyl group can comprise at least 4, 5, 6, 7, or 8 carbon atoms, and can comprise a branched, cyclic, or straight-chained alkyl group. The organosilane can be selected from alkyltrialkoxysilanes (e.g., n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane); methacryloxyalkyltrialkoxysilanes or acryloxyalkyltrialkoxysilanes (e.g., 3-methacryloxypropyltrimethoxysilane, 3-acryloxypropyltrimethoxysilane, and 3-(methacryloxy)propyltriethoxysilane); methacryloxyalkylalkyldialkoxysilanes or acryloxyalkylalkyldialkoxysilanes (e.g., 3-(methacryloxy)propylmethyldimethoxysilane, and 3-(acryloxypropyl)methyldimethoxysilane); methacryloxyalkyldialkylalkoxysilanes or acyrloxyalkyldialkylalkoxysilanes (e.g., 3 (methacryloxy)propyldimethylethoxysilane; mercaptoalkyltrialkoxylsilanes, such as 3-mercaptopropyltrimethoxysilane); aryltrialkoxysilanes (e.g., styrylethyltrimethoxysilane, phenyltrimethoxysilane, phenyltriethoxysilane, and p-tolyltriethoxysilane); vinyl silanes (e.g., vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris(isobutoxy)silane, vinyltriisopropenoxysilane, and vinyltris(2-methoxyethoxy)silane); or a combination thereof.

In embodiments, hydrophobic film 110 is formed from one or more hydrophobic treatment fluids comprising silicon dioxide solvated in a solvent (e.g., ethanol), organo-siloxanes, fluoropolymers, fluorinated compounds including fluorinated hydrocarbons, fluorosilanes, fluoroalkylsilanes, fluorosiloxanes, flourosilazane tetrafluoroethylene/(perfluoroalkyl) vinyl ether copolymers, perfluoroalkyl phosphates, perfluoroalcohol phosphates, perfluoroalkyl ethyl methacrylates, polyfluoroalkylethyl methacrylate/alkylmethacrylate copolymers, polyalkoxysilane methacrylate/perfluorooctyl methacrylate, perfluoroalcohol phosphates, mixtures of perfluoroalcohol phosphates and polysiloxanes, mixtures of perfluoroalcohol phosphates and acrylate silicone copolymers, tetrafluoroethylene/hexafluoropropylene copolymer, polytetrafluoroethylene, polyxylylene, fluorinated polyhedral oligomeric silsesquioxanes, or a combination thereof. For example, the polytetrafluoroethylene can comprise TEFLON. By way of non-limiting example, the fluorosilane can comprise perfluoroalkylsilane.

As noted hereinabove, forming the hydrophobic film 110 can comprise forming the hydrophobic film 110 on formation 100 particulates and/or proppant particles 112 during drilling of a wellbore of the injection well 101, the production well 103, or both, during a hydraulic fracturing treatment of the injection well 101, the production well 103, or both, or injecting the treatment fluid downhole (e.g., as a component of the circulating fluid C during geothermal operations), to allow the one or more surfaces to possess a hydrophobic, water-repelling property. Forming the hydrophobic film, at 11, can comprise: (1) adsorbing one or more polymers on to the one or more surfaces, (2) polymerizing one or more monomers adsorbed onto the one or more surfaces, (3) chemically functionalizing the one or more surfaces, or (4) any combination thereof.

The one or more polymers can comprise crosslinked polyorganosiloxane, fluorinated polymers, partially-fluorinated polymers, fluoroalkyl-functional organopolysiloxanes, poly(perfluoroalkyl ethyl methacrylate), polytetrafluoroethylene, polyvinylidene fluoride, polyfluoroacrylate, fluorinated oxetane co- or tere-polymers, fluorinated resins, polyvinyl fluoride, fluoroalkyl-polyurethane copolymer, or a combination thereof.

The one or more monomers can comprise one or more fluoro-monomers optionally in conjunction with one or more non-fluoro-monomers. The one or more fluoro-monomers can comprise a fluoroalkyl monomer, a perfluoroalkyl monomer, a vinyl fluoroalkyl monomer, a vinyl perfluoroalkyl monomer, a fluoroalkyl methacrylate monomer, a methacrylate perfluoroalkyl monomer, a fluoroalkyl acrylate monomer, a perfluoroalkyl acrylate monomer, a fluoroalkyl epoxy monomer, a perfluoroalkyl epoxy monomer, a fluoroalkyl urethane monomer, a perfluoroalkyl urethane monomer, a fluoroalkyl-containing monomeric alkoxylsilane, a fluoroalkyl-containing monomeric silanol, a fluoroalkyl-containing monomeric siloxane, perfluoroalkylethyl methacrylate, vinyl fluoride, vinylidene fluoride, tetrafluoroethylene, perfluoropropylvinylether, chlorotrifluoroethylene, or a mono-substituted oxetane monomer having fluorinated alkoxymethylene side-chains, where the alkyl groups of the side chains can range from about C3 to about C12, or a combination thereof. The one or more non-fluoro-monomers can be selected from ethylene, propylene, acrylate, methacrylate, silanes, organosilanes, siloxanes, organosiloxanes, or a combination thereof. The one or more monomers can include two or more fluoro-monomers, in embodiments. By way of non-limiting example, in embodiments, the two or more fluoro-monomers comprise a vinyl trifluoromethyl monomer and a vinyl perfluoroalkyl monomer having an alkyl group in a range of from about C3 to about C12, which can be polymerized via free-radical or radiation-induced polymerization.

In embodiments comprising (2) polymerizing one or more monomers adsorbed onto the one or more surfaces, the hydrophobic film comprises a polymer coating, and in situ reactions can be utilized to form the polymer coating on the one or more surfaces (e.g., polymerization of monomers adsorbed to a downhole surface, such as a near formation 100' proximate natural or induced fractures 105). The reactions can involve the one or more monomers, one or more surfactants, one or more initiators, or a combination thereof. By way of non-limiting examples, the one or more surfactants can comprise sodium dodecyl sulfate, linear alkenyl-benzyl sulfonate, dodecylbenzenesulfonic acid, or a combination thereof. By way of non-limiting examples, the one or more initiators comprise chemical initiators (e.g., 2,2'-azo-bis(2 methylpropionamidine) dihydrochloride, sodium persulfate, or the like), physical initiators (e.g., heat, IR radiation, UV radiation, sonic waves, or the like), or a combination thereof. In embodiments, the one or more monomers and the one or more surfactants can be adsorbed onto the one or more surfaces and subsequently the one or more surfaces having the one or more monomers and the one or more surfactants adsorbed thereon can be contacted with the one or more initiators.

By way of further example, in embodiments, polymerizing one or more monomers adsorbed onto the one or more surfaces can comprise reacting a first silane with the one or more surfaces, where the first silane comprises a functional linking group and a silane group, and subsequently reacting a second silane with the first silane to form a siloxane bond, where the second silane comprises a hydrophobic aliphatic group and a silane group.

In embodiments, an aqueous-based solution comprising a metal silicate can be added to the cold circulating fluid C injected into injection wellbore 101 at 104 (e.g., the "injection fluid") or to the hot circulating fluid C exiting production wellbore 103 (e.g., the "producing fluid") to treat the interior surfaces of downhole tubing, turbo-expanders, heat exchangers, compressors, or the like, to prevent/mitigate corrosion or scale forming from occurring during geothermal operations.

The hydrophobic film 110 can have a thickness in a range of from about 1 nanometer (nm) to about 10 micometers (µm), from about 1 nm to about 1 µm, or from about 1 nm to about 100 nm, or less than or equal to about 10, 9, 8, 7, 6, 5, 4, 3, 2, 1, or 0.5 µm, or less than or equal to about 900, 800, 700, 600, 500, 400, 300, 200, 100, 50, 40, 30, 20, 10, 9, 8, 7, 6, 5, 4, 3, 2, 1, or 0.5 nm, in embodiments.

By generating a high-temperature tolerant, hydrophobic coating or film 110 (also referred to herein as an "anti-water barrier", a "hydrophobic film", a "hydrophobic layer" or a "hydrophobic coating"), as described herein, on the surfaces of formation particulates in the wellbore wall, fracture faces, and their adjacent formations, an effective barrier to fluid loss (e.g., a "water barrier") can be formed to mitigate fluid loss and imbibition into the rock formation 100.

Hydrophobic film forming on downhole surfaces and surface equipment (e.g., pumps, turbo-expanders, heat exchangers/condensers, internal tubing surfaces, etc.), as per embodiments of this disclosure, can also be utilized to help mitigate issues of corrosion and scale forming.

In embodiments, the hydrophobic compounds described herein can be emulsified to form micro- or nano-emulsions. Providing the hydrophobic treatment fluid as an emulsification can help ease placement of the hydrophobic film-forming agents, for example, into the propped fractures, the formations adjacent fracture faces, and/or into the near-wellbore region of rock formation 100 surrounding the wellbore (e.g., injection wellbore 101, producing wellbore 103 described hereinabove).

In embodiments, as described hereinabove, non-hydrophobic nanoparticles can be treated with a hydrophobic film-forming agent for use in treating downhole surfaces, thereby allowing such non-hydrophobic particles to possess the desired hydrophobic property.

The system and method of this disclosure provide for generating hydrophobic surfaces for preventing/mitigating water penetration or water imbibition into rock formations of geothermal wells, thereby enhancing the performance efficiency of fluid injection and production, while also potentially protecting the surface and/or downhole equipment from corrosion and/or scale forming issues during geothermal operations.

Depending on fracture 105 size and thickness of hydrophobic film 110, hydrophobic film 110 can also provide fluid loss control due to its physical size, in aspects.

Other advantages will be apparent to those of skill in the art and with the help of this disclosure.

Example

The embodiments having been generally described, the following examples are given as particular examples to demonstrate the practice and advantages of this disclosure. It is understood that the examples are given by way of illustration and are not intended to limit the specification or the claims in any manner.

Comparative Example 1

Titanium flow cells (1-inch inner diameter and 2-inch length) were packed with 70/170-mesh sand, to simulate formation sand. Pressure transducers were installed at the inlet and outlet of the flow cells for measuring the pressure drop across the sand pack. A backpressure regulator was set at 800 psi. Each of the sand packs was first saturated by flowing four pore volumes (~50 mL) of 3% KCl brine and heated to 200° F. (93.3°. In a control experiment, a simulated seawater was flowed at a rate of 5 mL/min. The simulated seawater was produced by simultaneous injecting Brine 1 and Brine 2 of Table 1 into the flow cell. The simulated seawater serves as a source for forming $CaCO_3$ scale. The pressure drop across the flow cell was measured during injection/flow of the simulated seawater. Over about a 4-hour period, around 23 hours after flow began, the pressure drop across the flow cell increased rapidly from essentially no pressure difference to over 140 psi pressure difference. This indicates that the flow path through the sand pack was rapidly restricted due to scale buildup.

TABLE 1

| Brine 1 | | Brine 2 | |
| --- | --- | --- | --- |
| Composition | Amount (g/L) | Composition | Amount (g/L) |
| NaCl | 49.59 | NaCl | 49.59 |
| $CaCl \cdot 2H_2O$ | 7.48 | NaHCO3 | 1.38 |
| $MgCl_2 \cdot 6H_2O$ | 4.43 | | |
| KCl | 2.08 | | |
| $BaCl_2 \cdot 2H_2O$ | 1.01 | | |
| $SrCl_2 : 6H_2O$ | 0.88 | | |

Example 1

In a test of a hydrophobically modified amine-containing polymer, the sand pack (after saturation with 3% KCl) was treated with three pore volumes (~38 mL) of 4% hydrophobically modified polyethyleneimine ("PEI") solution. This hydrophobic modified PEI was an amidation product of tall oil fatty acid and PEI with 50% molar ratio of hydrophobes based on the nitrogen sites of PEI. The simulated seawater was then flowed as described in the control experiment. Over a 55-hour test period, the pressure drop across the flow cell remained the same with essentially no pressure drop. This indicates that the flow path through the sand pack was essentially unchanged and scale buildup in the flow path was negligible.

Additional Disclosure

The following are non-limiting, specific embodiments in accordance with the present disclosure:

In a first embodiment, a method comprises: forming a hydrophobic film on one or more surfaces as part of a geothermal operation in which a circulating fluid comprising water is injected into an injection well, absorbs heat, and is recovered from a production well prior to extraction of at least a portion of the heat therefrom and recycle of the circulating fluid back to the or another injection well.

A second embodiment can include the method of the first embodiment, wherein forming the hydrophobic film further comprises forming a drilling fluid comprising one or more hydrophobic film-forming agents, and utilizing the drilling fluid during the drilling of the injection well, the production well, or both, whereby the hydrophobic film is formed on the one or more surfaces, wherein the one or more surfaces comprise surfaces of formation particulates located in a wellbore wall or in a formation matrix adjacent the wellbore wall, and wherein the hydrophobic film reduces loss of the circulating fluid during the circulation of the circulating fluid relative to circulation of the circulating fluid in the absence of the hydrophobic film.

A third embodiment can include the method of the first or second embodiment, wherein forming the hydrophobic film further comprises forming a fracturing fluid comprising one or more hydrophobic film-forming agents, and utilizing the fracturing fluid during hydraulic fracturing treatments to generate propped fractures in the injection well, the production well, or both, whereby the hydrophobic film is formed on the one or more surfaces, wherein the one or more surfaces comprise a surface of the proppant particles, the created fracture faces, and/or the formation particulates in a formation matrix adjacent the fracture faces, and wherein the hydrophobic film reduces loss of the circulating fluid during circulation of the circulating fluid relative to circulation of the circulating fluid in the absence of the hydrophobic film.

A fourth embodiment can include the method of any one of the first to third embodiments, wherein forming the hydrophobic film further comprises continuously or intermittently adding one or more hydrophobic film-forming agents at a known concentration into the circulating fluid, thereby allowing the one or more surfaces to be coated with the hydrophobic film, wherein the one or more surfaces comprise a surface of a wellbore wall, a formation matrix adjacent the wellbore wall, fracture faces, a formation matrix adjacent the fracture faces, and/or surfaces of downhole and/or surface equipment.

A fifth embodiment can include the method of the fourth embodiment, wherein the surface equipment comprises one or more component selected from pumps, compressors, turbo-expanders, heat exchangers, condensers, tubing, pipes, or a combination thereof.

A sixth embodiment can include the method of any one of the first to fifth embodiments, wherein the surface comprises a downhole surface selected from a wellbore surface, a wellbore equipment surface, a near-wellbore region surface, a subterranean formation surface, a subterranean formation pore surface, a fracture surface, a natural fracture surface, an induced fracture face surface, a proppant surface, or a combination thereof.

A seventh embodiment can include the method of any one of the first to sixth embodiments, wherein forming the hydrophobic film further comprises contacting the one or more surfaces with a hydrophobic treatment fluid comprising one or more hydrophobic film-forming agents and a base fluid.

An eighth embodiment can include the method of the seventh embodiment, wherein the hydrophobic treatment fluid comprises an aqueous-based fluid, a non-aqueous-based fluid, a gas, a foam, an emulsion, or a combination thereof.

A ninth embodiment can include the method of the eighth embodiment, wherein the one or more hydrophobic film-forming agents are dispersed in the base fluid in an amount ranging from about 0.01% to about 10% by weight of the base fluid.

A tenth embodiment can include the method of any one of the seventh to ninth embodiments, wherein the hydrophobic treatment fluid comprises an oil-based fluid, an aqueous-based fluid, an aqueous-miscible fluid, a water-in-oil emulsion, or an oil-in-water emulsion.

An eleventh embodiment can include the method of the tenth embodiment, wherein the oil-based fluid is selected from alkanes, olefins, aromatic organic compounds, cyclic alkanes, paraffins, diesel fluids, mineral oils, desulfurized hydrogenated kerosenes, or a combination thereof.

A twelfth embodiment can include the method of the tenth or eleventh embodiment, wherein the aqueous-based fluid is selected from fresh water, saltwater (e.g., water containing one or more salts dissolved therein), brine (e.g., saturated salt water), seawater, and a combination thereof.

A thirteenth embodiment can include the method of any one of the tenth to twelfth embodiments, wherein the aqueous-miscible fluid is selected from alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; derivatives thereof; or a combination thereof.

A fourteenth embodiment can include the method of any one of the seventh to thirteenth embodiments, wherein the one or more hydrophobic, film-forming agents are selected from solvated silicon dioxide, an organo-siloxane, a fluoropolymer, a fluorinated compound, a tetrafluoroethylene/ (perfluoroalkyl) vinyl ether copolymer, a perfluoroalkyl phosphate, a perfluoroalkyl ethyl methacrylate, a fluorinated hydrocarbon, a polyfluoroalkyl ethyl methacrylate/alkyl methacrylate copolymer, per fluoroalcohol phosphate, a per fluoroalcohol phosphate/polysiloxane mixture, a per fluoroalcohol phosphate/acrylate silicone copolymer mixture, a tetrafluoroethylene/hexafluoropropylene copolymer, polytetrafluoroethylene, poly xylylene, a fluorinated polyhedral oligomeric silsesquioxane, an alkoxysilane, a chlorosilane, a fluorosilane, a perfluoroalkyl silane, a fluorosilane having an urethane linkage, a fluorosilane having its silicone part partially modified with fluorine or fluoride, a fluorosiloxane, a fluoroalkylsilane, a fluorosilazane, or a combination thereof.

A fifteenth embodiment can include the method of any one of the seventh to fourteenth embodiments, wherein the hydrophobic, film-forming agents are selected from hydrophobically modified amine-containing polymers, wherein the amine-containing polymers comprise at least one selected from the group consisting of: a polyamine, a polyimine, a polyamide, poly(2-(N,N-dimethylamino)ethyl methacrylate), poly(2-(N,N-diethylamino)ethyl methacrylate), poly(vinyl imidazole), a copolymer thereof, and a combination thereof, and wherein the hydrophobic modification comprises a C4-C30 characterized by at least one selected from a straight chain, a branched chain, an unsaturated C—C bond, an aryl group, or a combination thereof.

A sixteenth embodiment can include the method of any one of the seventh to fifteenth embodiments, wherein the hydrophobic treatment fluid comprises a hydrophobic emulsion comprising: an aqueous continuous phase having dispersed therein a plurality of non-aqueous discontinuous phase droplets, wherein each of the non-aqueous discontinuous phase droplets comprises a plurality of surfactant molecules and a hydrophobic film-forming agent, wherein each surfactant molecule comprises a hydrophilic head portion and a hydrophobic tail portion, wherein each of the plurality of non-aqueous discontinuous phase droplets comprises the plurality surfactant molecules having the hydrophilic head portions disposed into a droplet outer layer with the hydrophobic tail portions extending inward from the droplet outer layer toward the hydrophobic film-forming agent, wherein the droplet outer layer encloses the hydrophobic film-forming agent.

A seventeenth embodiment can include the method of any one of the seventh to sixteenth embodiments, wherein the hydrophobic treatment fluid comprises a drilling fluid, a fracturing fluid, or the circulating fluid.

An eighteenth embodiment can include the method of any one of the seventh to seventeenth embodiments, wherein the hydrophobic treatment fluid comprises hydrophobic nanoparticles (e.g., that are repellent to water to facilitate recovery of circulating fluid and mitigate/prevent water imbibition into the formation during geothermal operation).

A nineteenth embodiment can include the method of the eighteenth embodiment further comprising forming the hydrophobic nanoparticles by rendering nanoparticles hydrophobic by modifying a surface of the nanoparticles with a hydrophobic surface treatment.

A twentieth embodiment can include the method of the nineteenth embodiment, wherein the hydrophobic surface treatment comprises attaching a surface modification agent to the (e.g., inorganic oxide) nanoparticles to modify the surface of the inorganic oxide nanoparticles.

A twenty first embodiment can include the method of the twentieth embodiment, wherein the surface modification agent comprises a first end configured for attaching (e.g., covalently, ionically or through strong physisorption) to the surface of the nanoparticles, and a second end that imparts steric stabilization for preventing the nanoparticles from agglomerating (e.g., permanently fusing) together.

A twenty second embodiment can include the method of any one of the nineteenth to twenty first embodiments, wherein the nanoparticles comprise a material selected from silica, silicon oxide, aluminum, iron, titanium, metal oxides, metal hydroxides, graphene, or a combination thereof.

A twenty third embodiment can include the method of any one of the eighteenth to twenty second embodiments, wherein the hydrophobic nanoparticles are formed of a material that is naturally hydrophobic.

A twenty fourth embodiment can include the method of any one of the eighteenth to twenty third embodiments, wherein the hydrophobic nanoparticles are formed by at least partially coating (e.g., partially or completely coating) nanoparticles that are not hydrophobic, with a hydrophobic coating.

A twenty fifth embodiment can include the method of the twenty fourth embodiment, further comprising rendering hydrophobic the nanoparticles that are not hydrophobic via a surface treatment with an organosilane, wherein the organosilane comprises an alkyl group.

A twenty sixth embodiment can include the method of the twenty fifth embodiment, wherein the alkyl group comprises at least 4, 5, 6, 7, or 8 carbon atoms, and comprises a branched, cyclic, or straight-chained alkyl group.

A twenty seventh embodiment can include the method of the twenty fifth or twenty sixth embodiments, wherein the organosilane is selected from alkyltrialkoxysilanes (e.g., n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane); methacryloxyalkyltrialkoxysilanes or acryloxyalkyltrialkoxysilanes (e.g., 3-methacryloxypropyltrimethoxysilane, 3-acryloxypropyltrimethoxysilane, and 3-(methacryloxy)propyltriethoxysilane); methacryloxyalkylalkyldialkoxysilanes or acryloxyalkylalkyldialkoxysilanes (e.g., 3-(methacryloxy)propylmethyldimethoxysilane, and 3-(acryloxypropyl)methyldimethoxysilane); methacryloxyalkyldialkylalkoxysilanes or acyrloxyalkyldialkylalkoxysilanes (e.g., 3 (methacryloxy)propyldimethylethoxysilane; mercaptoalkyltrialkoxylsilanes, such as 3-mercaptopropyltrimethoxysilane); aryltrialkoxysilanes (e.g., styrylethyltrimethoxysilane, phenyltrimethoxysilane, phenyltriethoxysilane, and p-tolyltriethoxysilane); vinyl silanes (e.g., vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris(isobutoxy)silane, vinyltriisopropenoxysilane, and vinyltris(2-methoxyethoxy)silane); or a combination thereof.

A twenty eighth embodiment can include the method of any one of the eighteenth to twenty seventh embodiments, wherein the nanoparticles comprise or have been surface modified to have a surface comprising: silicon dioxide solvated in a solvent (e.g., ethanol), organo-siloxanes, fluoropolymers, fluorinated compounds including fluorinated hydrocarbons, fluorosilanes, fluoroalkylsilanes, fluorosiloxanes, flourosilazane tetrafluoroethylene/(perfluoroalkyl) vinyl ether copolymers, perfluoroalkyl phosphates, perfluoroalcohol phosphates, perfluoroalkyl ethyl methacrylates, polyfluoroalkylethyl methacrylate/alkylmethacrylate copolymers, polyalkoxysilane methacrylate/perfluorooctyl methacrylate, perfluoroalcohol phosphates, mixtures of perfluoroalcohol phosphates and polysiloxanes, mixtures of perfluoroalcohol phosphates and acrylate silicone copolymers, tetrafluoroethylene/hexafluoropropylene copolymer, polytetrafluoroethylene, polyxylylene, fluorinated polyhedral oligomeric silsesquioxanes, or a combination thereof.

A twenty ninth embodiment can include the method of the twenty eighth embodiment, wherein the polytetrafluoroethylene comprises TEFLON.

A thirtieth embodiment can include the method of the twenty eighth or twenty ninth embodiment, wherein the fluorosilane comprises perfluoroalkylsilane.

A thirty first embodiment can include the method of any one of the first to thirtieth embodiments, wherein forming the hydrophobic film comprises forming the hydrophobic film on formation particulates and/or proppant particles during drilling of a wellbore of the injection well, the production well, or both, during a hydraulic fracturing treatment of the injection well, the production well, or both, or injecting the treatment fluid downhole, to allow the one or more surfaces to possess a hydrophobic property.

A thirty second embodiment can include the method of any one of the first to thirty first embodiments, wherein forming the hydrophobic film comprises (1) adsorbing one or more polymers on to the one or more surfaces, (2) polymerizing one or more monomers adsorbed onto the one or more surfaces. (3) chemically functionalizing the one or more surfaces, or (4) any combination thereof.

A thirty third embodiment can include the method of the thirty second embodiment, wherein the one or more polymers comprise crosslinked polyorganosiloxane, fluorinated polymers, partially-fluorinated polymers, fluoroalkyl-functional organopolysiloxanes, poly(perfluoroalkyl ethyl methacrylate), polytetrafluoroethylene, polyvinylidene fluoride, polyfluoroacrylate, fluorinated oxetane co- or ter-polymers, fluorinated resins, polyvinyl fluoride, fluoroalkyl-polyurethane copolymer, or a combination thereof.

A thirty fourth embodiment can include the method of the thirty second or thirty embodiment, wherein the one or more monomers comprise one or more fluoro-monomers optionally in conjunction with one or more non-fluoro-monomers.

A thirty fifth embodiment can include the method of the thirty fourth embodiment, wherein the one or more fluoromonomers comprise a fluoroalkyl monomer, a perfluoroalkyl monomer, a vinyl fluoroalkyl monomer, a vinyl perfluoroalkyl monomer, a fluoroalkyl methacrylate monomer, a methacrylate perfluoroalkyl monomer, a fluoroalkyl acrylate monomer, a perfluoroalkyl acrylate monomer, a fluoroalkyl epoxy monomer, a perfluoroalkyl epoxy monomer, a fluoroalkyl urethane monomer, a perfluoroalkyl urethane monomer, a fluoroalkyl-containing monomeric alkoxylsilane, a fluoroalkyl-containing monomeric silanol, a fluoroalkyl-containing monomeric siloxane, perfluoroalkylethyl methacrylate, vinyl fluoride, vinylidene fluoride, tetrafluoroethylene, perfluoropropylvinylether, chlorotrifluoroethylene, or a mono-substituted oxetane monomer having fluorinated alkoxymethylene side-chains, where the alkyl groups of the side chains can range from about C3 to about C12.

A thirty sixth embodiment can include the method of the thirty fourth or thirty fifth embodiment, wherein the one or more non-fluoro-monomers are selected from ethylene, propylene, acrylate, methacrylate, silanes, organosilanes, siloxanes, organosiloxanes, or a combination thereof.

A thirty seventh embodiment can include the method of any one of the thirty second to thirty sixth embodiments, comprising two or more fluoro-monomers.

A thirty eighth embodiment can include the method of the thirty seventh embodiment, wherein the two or more fluoromonomers comprise a vinyl trifluoromethyl monomer and a vinyl perfluoroalkyl monomer having an alkyl group in a range of from about C3 to about C12.

A thirty ninth embodiment can include the method of the thirty eighth embodiment, wherein the one or more monomers are polymerized by free-radical or radiation-induced polymerization.

A fortieth embodiment can include the method of any one of the thirty fourth to thirty ninth embodiments, comprising (2) polymerizing one or more monomers adsorbed onto the one or more surfaces, wherein the hydrophobic film comprises a polymer coating, and wherein reactions are utilized to form the polymer coating in situ.

A forty first embodiment can include the method of the fortieth embodiment, wherein the reactions comprise the one or more monomers, one or more surfactants, one or more initiators, or a combination thereof.

A forty second embodiment can include the method of the forty first embodiment, wherein the one or more surfactants comprise sodium dodecyl sulfate, linear alkenylbenzyl sulfonate, dodecylbenzenesulfonic acid, or a combination thereof.

A forty third embodiment can include the method of the forty first or forty second embodiment, wherein the one or more initiators comprise chemical initiators (e.g., 2,2'-azobis(2 methylpropionamidine) dihydrochloride, sodium persulfate, or the like), physical initiators (e.g., heat, IR radiation, UV radiation, sonic waves, or the like), or a combination thereof.

A forty fourth embodiment can include the method of any one of the forty first to forty third embodiments, comprising adsorbing the one or more monomers and the one or more surfactants to the one or more surfaces and subsequently contacting the one or more surfaces having the one or more monomers and the one or more surfactants adsorbed thereon with the one or more initiators.

A forty fifth embodiment can include the method of any one of the fortieth to forty fourth embodiments, wherein polymerizing one or more monomers adsorbed onto the one or more surfaces further comprises reacting a first silane with the one or more surfaces, where the first silane comprises a functional linking group and a silane group, and subsequently reacting a second silane with the first silane to form a siloxane bond, where the second silane comprises a hydrophobic aliphatic group and a silane group.

In a forty sixth embodiment, a method comprises: introducing a circulating fluid into an injection well of a geothermal system, allowing the circulating fluid to pass through fractures in a formation to a producing well, whereby the circulating fluid is heated, producing the circulating fluid that is heated from the producing well; extracting heat from the circulating fluid that is heated; and recycling the circulating fluid from which the heat has been extracted to the or another injection well, wherein one or more surfaces that come into contact with the circulating fluid are coated with a hydrophobic film.

A forty seventh embodiment can include the method of the forty sixth embodiment further comprising coating the one or more surfaces with the hydrophobic film.

A forty eighth embodiment can include the method of the forty seventh embodiment, wherein coating the one or more surfaces with the hydrophobic film further comprises drilling the injection well, the production well, or both the injection well and the production well, with a drilling fluid comprising one or more hydrophobic film-forming agents, whereby the hydrophobic film forms on the one or more surfaces, wherein the one or more surfaces comprise surfaces of formation particulates located in a wellbore wall or in a formation matrix adjacent the wellbore wall, and wherein the hydrophobic film reduces loss of circulating fluid during the circulation of the circulating fluid relative to circulation of the circulating fluid in the absence of the hydrophobic film.

A forty ninth embodiment can include the method of any one of the forty seventh to forty eighth embodiments, wherein coating the one or more surfaces with the hydrophobic film further comprises hydraulically fracturing the injection well, the production well, or both the injection well and the production well, with a hydraulic fracturing fluid comprising one or more hydrophobic film-forming agents to generate propped fractures in the injection well, the production well, or both, whereby the hydrophobic film forms on the one or more surfaces, wherein the one or more surfaces comprise a surface of the proppant particles, the created fracture faces, and/or the formation particulates in a formation matrix adjacent the fracture faces, and wherein the hydrophobic film reduces loss of the circulating fluid during circulation of the circulating fluid relative to circulation of the circulating fluid in the absence of the hydrophobic film.

A fiftieth embodiment can include the method of any one of the forty seventh to forty ninth embodiments, wherein coating the one or more surfaces with the hydrophobic film further comprises continuously or intermittently adding one or more hydrophobic film-forming agents into the circulating fluid, thereby allowing the one or more surfaces to be coated with the hydrophobic film, wherein the one or more surfaces comprise a surface of a wellbore wall, a formation matrix adjacent the wellbore wall, fracture faces, a formation matrix adjacent the fracture faces, and/or surfaces of downhole and/or surface equipment.

In a fifty first embodiment, a wellbore treatment fluid comprises: one or more hydrophobic film-forming agents, wherein the one or more film-forming agents are operable to interact with one or more surfaces with which the wellbore treatment fluid comes into contact to provide a hydrophobic film thereon, wherein the hydrophobic film reduces a loss of a circulating fluid into formation matrixes surrounding fracture faces during circulation of the circulating fluid in a geothermal system relative to circulation of the circulating fluid in the absence of the hydrophobic film.

A fifty second embodiment can include the wellbore treatment fluid of the fifty first embodiment, wherein the wellbore treatment fluid comprises a drilling fluid, a hydraulic fracturing fluid, or the circulating fluid.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit. Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applica-

What is claimed is:

1. A method comprising:
forming a hydrophobic film on one or more surfaces as part of a geothermal operation in which a circulating fluid comprising water is injected into an injection well, absorbs heat, and is recovered from a production well prior to extraction of at least a portion of the heat therefrom and recycle of the circulating fluid back to the or another injection well, wherein the one or more surfaces comprise surfaces of formation particulates located in a wellbore wall, a formation matrix adjacent the wellbore wall, fracture faces, a formation matrix adjacent the fracture faces, proppant particles, or a combination thereof,
wherein forming the hydrophobic film further comprises contacting the one or more surfaces with a hydrophobic treatment fluid comprising one or more hydrophobic film-forming agents and a base fluid, and wherein the hydrophobic treatment fluid comprises a hydrophobic emulsion comprising: an aqueous continuous phase having dispersed therein a plurality of non-aqueous discontinuous phase droplets, wherein each of the non-aqeuous discontinuous phase droplets comprises a plurality of surfactant molecules and a hydrophobic film-forming agent, wherein each surfactant molecules comprises a hydrophilic head portion and a hydrophobic tail portion, wherein each of the plurality of non-aqueous discontinuous phase droplets comprises the plurality of surfactant molecules having the hydrophilic head portions disposed into a droplet outer layer with the hydrophobic tail portion extending inward from the droplet outer layer toward the hydrophobic film-forming agent wherein the droplet outer layer encloses the hydrophobic film-forming agent.

2. The method of claim 1, wherein forming the hydrophobic film further comprises forming a drilling fluid comprising the one or more hydrophobic film-forming agents, and utilizing the drilling fluid during the drilling of the injection well, the production well, or both, whereby the hydrophobic film is formed on the one or more surfaces, wherein the one or more surfaces comprise surfaces of the formation particulates located in the wellbore wall or in the formation matrix adjacent the wellbore wall, and wherein the hydrophobic film reduces loss of the circulating fluid during the circulation of the circulating fluid relative to circulation of the circulating fluid in the absence of the hydrophobic film.

3. The method of claim 1, wherein forming the hydrophobic film further comprises forming a fracturing fluid comprising the one or more hydrophobic film-forming agents, and utilizing the fracturing fluid during hydraulic fracturing treatments to generate propped fractures in the injection well, the production well, or both, whereby the hydrophobic film is formed on the one or more surfaces, wherein the one or more surfaces comprise the surfaces of the proppant particles, the created fracture faces, and/or the formation particulates in the formation matrix adjacent the fracture faces, and wherein the hydrophobic film reduces loss of the circulating fluid during circulation of the circulating fluid relative to circulation of the circulating fluid in the absence of the hydrophobic film.

4. The method of claim 1, wherein forming the hydrophobic film further comprises continuously or intermittently adding the one or more hydrophobic film-forming agents at a known concentration into the circulating fluid, thereby allowing the one or more surfaces to be coated with the hydrophobic film.

5. The method of claim 1, wherein the one or more hydrophobic, film-forming agents are selected from solvated silicon dioxide, an organo-siloxane, a fluoropolymer, a fluorinated compound, a tetrafluoroethylene/(perfluoroalkyl) vinyl ether copolymer, a perfluoroalkyl phosphate, a perfluoroalkyl ethyl methacrylate, a fluorinated hydrocarbon, a polyfluoroalkyl ethyl methacrylate/alkyl methacrylate copolymer, per fluoroalcohol phosphate, a per fluoroalcohol phosphate/polysiloxane mixture, a per fluoroalcohol phosphate/acrylate silicone copolymer mixture, a tetrafluoroethylene/hexafluoropropylene copolymer, polytetrafluoroethylene, poly xylylene, a fluorinated polyhedral oligomeric silsesquioxane, an alkoxysilane, a chlorosilane, a fluorosilane, a perfluoroalkyl silane, a fluorosilane having an urethane linkage, a fluorosilane having its silicone part partially modified with fluorine or fluoride, a fluorosiloxane, a fluoroalkylsilane, a fluorosilazane, or a combination thereof.

6. The method of claim 1, wherein the hydrophobic, film-forming agents are selected from hydrophobically modified amine-containing polymers, wherein the amine-containing polymers comprise at least one selected from the group consisting of: a polyamine, a polyimine, a polyamide, poly(2-(N,N-dimethylamino)ethyl methacrylate), poly(2-(N,N-diethylamino)ethyl methacrylate), poly(vinyl imidazole), a copolymer thereof, and a combination thereof, and wherein the hydrophobic modification comprises a C4-C30 characterized by at least one selected from a straight chain, a branched chain, an unsaturated C—C bond, an aryl group, or a combination thereof.

7. The method of claim 1, wherein the hydrophobic treatment fluid further comprises hydrophobic nanoparticles.

8. The method of claim 7 further comprising forming the hydrophobic nanoparticles by rendering nanoparticles hydrophobic by modifying a surface of the nanoparticles with a hydrophobic surface treatment.

9. The method of claim 1, wherein forming the hydrophobic film comprises forming the hydrophobic film on formation particulates and/or proppant particles during drilling of a wellbore of the injection well, the production well, or both, during a hydraulic fracturing treatment of the injection well, the production well, or both, or injecting the circulating fluid downhole, to allow the one or more surfaces to possess a hydrophobic property.

10. The method of claim 1, wherein forming the hydrophobic film comprises (1) adsorbing one or more polymers on to the one or more surfaces, (2) polymerizing one or more monomers adsorbed onto the one or more surfaces, (3) chemically functionalizing the one or more surfaces, or (4) any combination thereof.

11. A method comprising:
forming a hydrophobic film on one or more surfaces as part of a geothermal operation in which a circulating fluid comprising water is injected into an injection well, absorbs heat, and is recovered from a production well prior to extraction of at least a portion of the heat therefrom and recycle of the circulating fluid back to the or another injection well, wherein forming the hydrophobic film further comprises contacting the one or more surfaces with a hydrophobic treatment fluid comprising one or more hydrophobic film-forming agents and a base fluid, and wherein the hydrophobic treatment fluid comprises a hydrophobic emulsion comprising: an aqueous continuous phase having dispersed therein a plurality of non-aqueous discontinuous phase droplets, wherein each of the non-aqueous discontinuous phase droplets comprises a plurality of surfactant molecules and a hydrophobic film-forming agent, wherein each surfactant molecule comprises a hydrophilic head portion and a hydrophobic tail portion, wherein each of the plurality of non-aqueous discontinuous phase droplets comprises the plurality, surfactant molecules having the hydrophilic head portions disposed into a droplet outer layer with the hydrophobic tail portions extending inward from the droplet outer layer toward the hydrophobic film-forming agent, wherein the droplet outer layer encloses the hydrophobic film-forming agent.

12. The method of claim 11, wherein the one or more surfaces comprise a downhole surface selected from a wellbore surface, a wellbore equipment surface, a near-wellbore region surface, a subterranean formation surface, a subterranean formation pore surface, a fracture surface, a natural fracture surface, an induced fracture face surface, a proppant surface, or a combination thereof.

13. A method comprising:
introducing a circulating fluid into an injection well of a geothermal system,
allowing the circulating fluid to pass through fractures in a formation to a producing well, whereby the circulating fluid is heated,
producing the circulating fluid that is heated from the producing well;
extracting heat from the circulating fluid that is heated; and
recycling the circulating fluid from which the heat has been extracted to the or another injection well,
wherein one or more surfaces that come into contact with the circulating fluid are coated with a hydrophobic film formed by contacting the one or more surfaces with a hydrophobic treatment fluid comprising one or more hydrophobic film-forming agents and a base fluid, and wherein the hydrophobic treatment fluid comprises a hydrophobic emulsion comprising: an aqueous continuous phase having dispersed therein a plurality of non-aqueous discontinuous phase droplets, wherein each of the non-aqueous discontinuous phase droplets comprises a plurality of surfactant molecules and a hydrophobic film-forming agent wherein each surfactant molecules comprises a hydrophilic head portion and a hydrophobic tail portion, wherein each of the plurality of non-aqueous discontinuous phase droplets comprises the plurality of surfactant molecules having the hydrophilic head portions disposed into a droplet outer layer with the hydrophobic tail portions extending inward from the droplet outer layer toward the hydrophobic film-forming agent, wherein the droplet outer layer encloses the hydrophobic film-forming agent, and wherein the one or more surfaces comprise surfaces of formation particulates located in a wellbore wall, a formation matrix adjacent the wellbore wall, fracture faces, a formation matrix adjacent the fracture faces, proppant particles, or a combination thereof.

14. The method of claim 13 further comprising coating the one or more surfaces with the hydrophobic film.

15. The method of claim 14, wherein coating the one or more surfaces with the hydrophobic film further comprises drilling the injection well, the production well, or both the injection well and the production well, with a drilling fluid comprising the treatment fluid comprising the one or more hydrophobic film-forming agents, whereby the hydrophobic film forms on the one or more surfaces, wherein the one or more surfaces comprise surfaces of the formation particulates located in the wellbore wall or in the formation matrix adjacent the wellbore wall, and wherein the hydrophobic film reduces loss of circulating fluid during the circulation of the circulating fluid relative to circulation of the circulating fluid in the absence of the hydrophobic film.

16. The method of claim 14, wherein coating the one or more surfaces with the hydrophobic film further comprises hydraulically fracturing the injection well, the production well, or both the injection well and the production well, with a hydraulic fracturing fluid comprising the hydrophobic treatment fluid comprising the one or more hydrophobic film-forming agents to generate propped fractures in the injection well, the production well, or both, whereby the hydrophobic film forms on the one or more surfaces, wherein the one or more surfaces comprise the surfaces of the proppant particles, the created fracture faces, and/or the formation particulates in the formation matrix adjacent the fracture faces, and wherein the hydrophobic film reduces loss of the circulating fluid during circulation of the circulating fluid relative to circulation of the circulating fluid in the absence of the hydrophobic film.

17. The method of claim 14, wherein coating the one or more surfaces with the hydrophobic film further comprises continuously or intermittently adding the hydrophobic treatment fluid comprising the one or more hydrophobic film-forming agents into the circulating fluid, thereby allowing the one or more surfaces to be coated with the hydrophobic film.

18. The method of claim 13, wherein the one or more hydrophobic film-forming agents are selected from hydrophobically modified amine-containing polymers, wherein the amine-containing polymers comprise at least one selected from the group consisting of: a polyamine, a polyimine, a polyamide, poly(2-(N,N-dimethylamino)ethyl methacrylate), poly(2-(N,N-diethylamino)ethyl methacrylate), poly(vinyl imidazole), a copolymer thereof, and a combination thereof, and wherein the hydrophobic modification comprises a C4-C30 characterized by at least one selected from a straight chain, a branched chain, an unsaturated C—C bond, an aryl group, or a combination thereof.

* * * * *